UNITED STATES PATENT OFFICE.

JONATHAN HILTON, OF NEW YORK, N. Y.

IMPROVEMENT IN DISINFECTANT COMPOUNDS.

Specification forming part of Letters Patent No. 141,274, dated July 29, 1873; application filed May 31, 1873.

*To all whom it may concern:*

Be it known that I, JONATHAN HILTON, of the city, county, and State of New York, have invented a new and Improved Disinfectant, of which the following is a specification:

My improved deodorizing and disinfecting compound is as follows, viz: One-one-hundredth ($\frac{1}{100}$) part of nitric acid is mixed with one (1) part of oil of tar. Three (3) quarts of this mixture are agitated with one hundred (100) pounds of carbonate of lime. One and a half ($1\frac{1}{2}$) pound of sulphur is burned in a retort, the sulphurous acid from which is caused to pass through the mixture of lime and oil of tar with the nitric acid until saturation, when, after settling, the fluid is separated from the solid parts. The solids are then dried, and, when reduced to powder, are fit for use. The fluid product is also very useful for pouring into sinks and other conduits requiring disinfection. This I propose to call "sulpho-carbolate of lime." It is a powerful deodorizer and disinfectant, and perfectly harmless if taken in moderate quantities internally. It has a powerful affinity for hydrogen gas, which is the basis of all miasmatic and malarious gases, which, when they part with their hydrogen to the sulpho-carbolate of lime, become perfectly innocuous. Its smell is not near so disagreeable as carbolic acid or chloride of lime. It is capable of being produced as cheap as the chloride of lime.

Having thus described my invention, I claim as new and desire to secure by Letters Patent—

1. The solid disinfecting compound, composed of the ingredients and made by the process substantially as herein described.

2. The liquid disinfecting compound, produced by the ingredients and process substantially as herein described.

JONATHAN HILTON.

Witnesses:
    HUGH WILLIAMSON,
    PATRICK FARLEY.